United States Patent [19]

Fuse et al.

[11] Patent Number: 5,541,757
[45] Date of Patent: Jul. 30, 1996

[54] OPTICAL FIBER CABLE SERVICE SYSTEM PROVIDED WITH VIDEO ON DEMAND SERVICE

[75] Inventors: Masaru Fuse, Toyonaka; Hiroaki Nakata, Hirakata; Katsuyuki Fujito, Higashi-Osaka, all of Japan

[73] Assignee: Matsushita Electric Industrial Co., Ltd., Osaka, Japan

[21] Appl. No.: 362,802

[22] Filed: Dec. 22, 1994

[30] Foreign Application Priority Data

Dec. 24, 1993 [JP] Japan ..................... 5-327502

[51] Int. Cl.$^6$ ..................... H04J 14/02; H04N 7/10
[52] U.S. Cl. ..................... 359/125; 359/124; 348/7; 348/10; 348/12
[58] Field of Search ..................... 359/124, 125; 348/7, 10, 12, 17, 13; 455/2

[56] References Cited

U.S. PATENT DOCUMENTS

| | | | |
|---|---|---|---|
| 5,204,767 | 4/1993 | Nakata et al. | 455/2 |
| 5,262,883 | 11/1993 | Pidgeon | 359/125 |
| 5,361,394 | 11/1994 | Shigihara | 348/12 |
| 5,418,559 | 5/1995 | Blahut | 348/12 |
| 5,421,031 | 5/1995 | De Bey | 348/12 |

OTHER PUBLICATIONS

"Erbium–Doped Fiber Amlifier for Video Distribution Networks", by E. Yoneda et al., IEEE Journal on Selected Areas in Communications, vol. 8, No. 7, Sept. 1990.
"AM Optical Bridger Networks for CATV", Donald Raskin et al., 1991 NCTA Technical Papers–13.
"Fiber to Feeder Design Study", J. Mattson, 1991 NCTA Technical Papers–309.

Primary Examiner—Leo Boudreau
Assistant Examiner—Bhavesh Mehta
Attorney, Agent, or Firm—Price, Gess & Ubell

[57] ABSTRACT

Video signals for broadcasting service with a plurality of channels are frequency-multiplexed into a predetermined broadcasting band, and converted into optical signals by an optical transmitter. At the same time, video signals for VOD service requested by a plurality of subscribers are selected, taken out, frequency-multiplexed within the VOD band, and converted into optical signals by an optical modulator. These two types of optical signals are transmitted to subscribers through the optical network. In each subscriber's household, either broadcasting signals or video signals for VOD service are reproduced and desired programs are selected in the tuners.

21 Claims, 9 Drawing Sheets

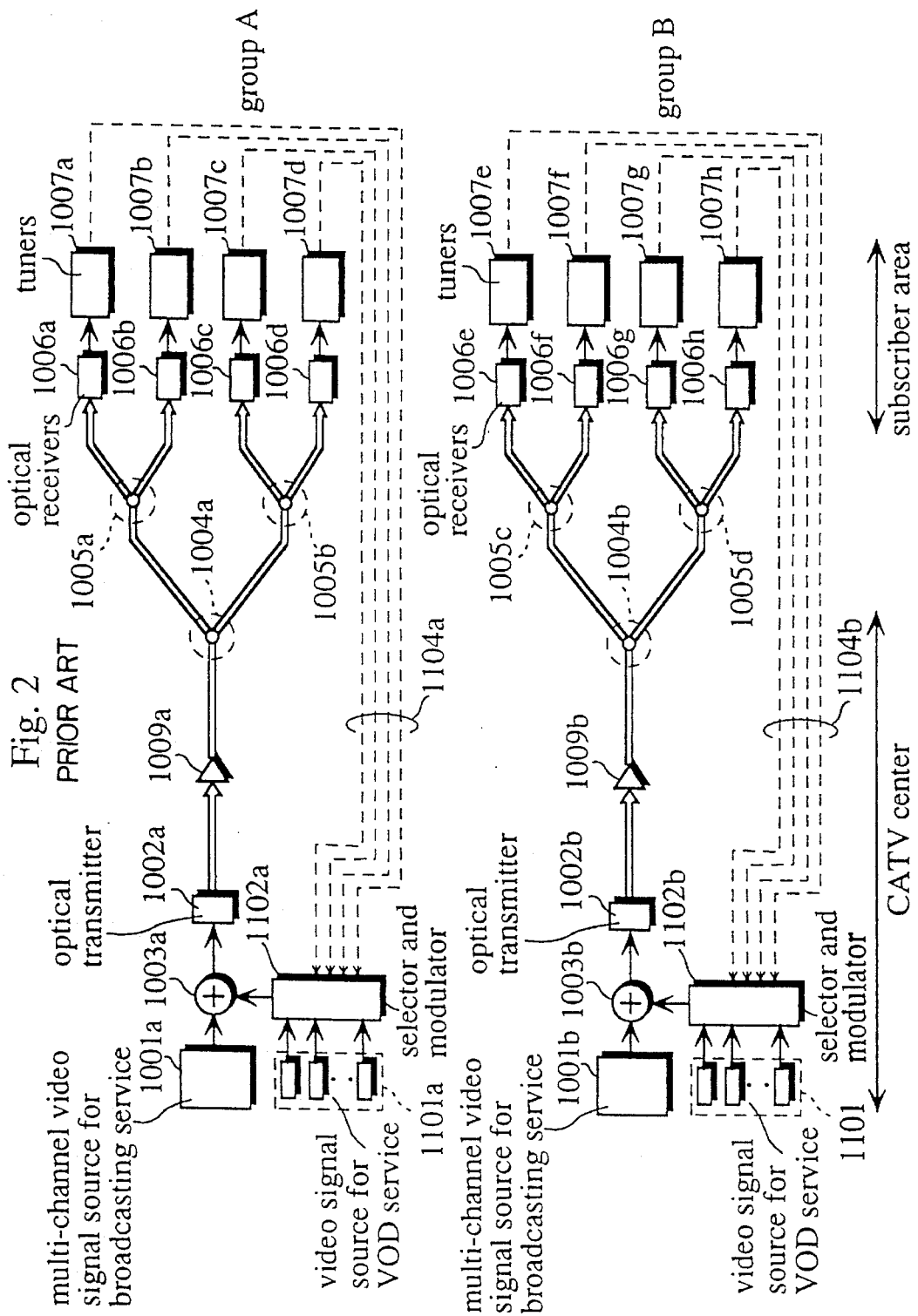

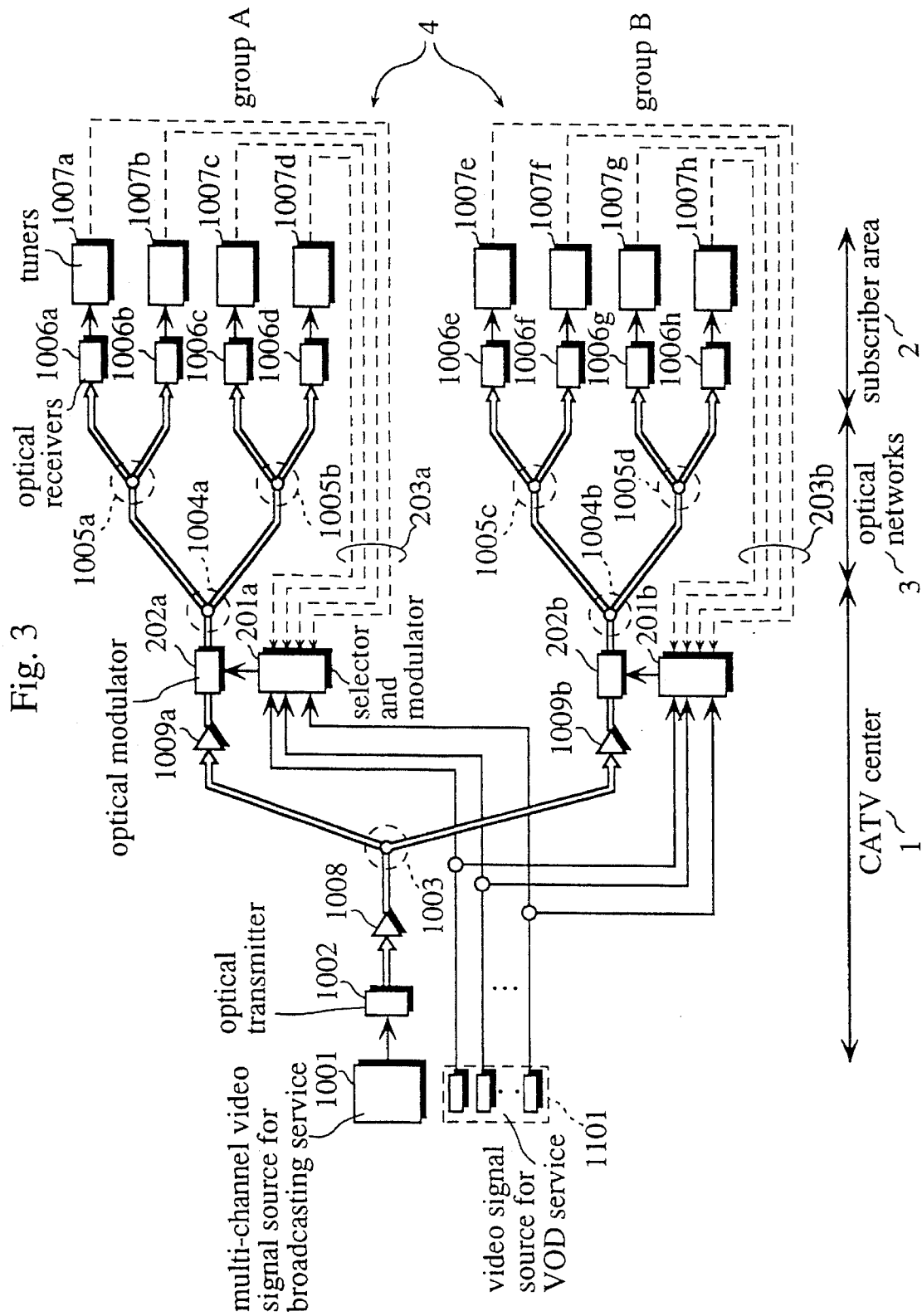

construction of the optical transmitter
based on direct modulation construction of the optical transmitter
based on external modulation construction of the optical modulator based on external modulation(no light source)

construction of the optical modulator based on direct modulation construction of the optical modulator based on optical external modulator(with light source)

first construction of the optical receiver second construction of the optical receiver when the entire transmission band has one octave width when frequency span of carriers are different between broadcasting band and VOD band when VOD carrier frequency is not equal to $fb + n \cdot fm$ (n is an integer)

frequency position of $fb + n \cdot fm$

OPTICAL FIBER CABLE SERVICE SYSTEM PROVIDED WITH VIDEO ON DEMAND SERVICE

BACKGROUND OF THE INVENTION (1) Field of the Invention

The present invention relates to an optical fiber cable service system provided with video on demand service.

(2) Description of the Prior Art

Cable and telecommunication television system (hereinafter CATV) is a system for distributing high-quality television signals to each household's television set through a broad band transmission path such as a coaxial cable. Recently, with the progress of optical transmission technology, optical fiber cable service system has been applied to the arterial lines in order to expand the service area and to improve transmission performance. Furthermore, in order to realize B-ISDN, the establishment of optical network based on FTTH (Fiber To The Home) has been expected which provides each household with transmission and broadcasting service by means of a single optical fiber. Thus, the conventional Community Antenna Television System has been replaced by Cable and Telecommunication Television System.

Generally, analog SCM (Sub-Carrier Multiplexing) transmission system is employed for optical network where light is used as a main carrier. To be more specific, transmission signals such as video signals are modulated by means of a carrier having a pre-assigned frequency (sub carrier) in accordance with a predetermined modulation method (such as AM modulation or FM modulation), in order to form frequency-multiplexed signals in a predetermined transmission band (that is broadcasting band). The frequency-multiplexed signals are converted into optical intensity modulated signals and outputted. This allows multi-channel video signals to be transmitted concurrently through a single optical fiber transmission path, thereby realizing an optical cable service system.

The technique of optical analog video transmission systems are described in IEEE JOURNAL ON SELECTED AREA IN COMMUNICATIONS. VOL. 8. NO. 7. SEPTEMBER 1990 P.1249–1255 and 1991 NCTA Technical Papers P.13–19 and P.309–319.

The optical CATV system, on the other hand, offers video on demand (hereinafter VOD) service in addition to the general broadcasting service. The VOD service means to select a program desired by a subscriber from the program menu and sends the selected program to the subscriber.

FIG. 1 is a block diagram showing a general construction of an optical CATV system provided with the VOD service, and an optical network with FTTH is provided between the CATV center and each subscriber area. The analog SCM transmission system offers multi-channel video signals as broadcasting programs and video signals for VOD service to the subscribers from the CATV center.

The multi-channel video signal source 1001, which is provided with a plurality of analog base band video signal sources, modulates each video signal by means of a carrier having a pre-assigned frequency through a predetermined modulation method (for example AM modulation), frequency-multiplexes the modulated signal within a predetermined broadcasting band, and outputs it.

The video signal source 1101 for VOD service is provided with either an analog base band video signal source or a digital video signal source for VOD service having a plurality of programs.

The selector and modulator 1102 selects appropriate programs from the video signal source 1101 for VOD service in accordance with the VOD send-out request signal 1104 received from a subscriber, modulates the video signals of each of the selected programs by means of a carrier having a frequency pre-assigned within a predetermined VOD band, which does not overlap the broadcasting band. Then, the modulated video signals are frequency-multiplexed and outputted.

The frequency multiplexer 1003 frequency-multiplexes the output signal of the multi-channel video signal source 1001 and the output signal of the selector and modulator 1102, thereby outputting to the optical transmitter 1002.

The optical transmitter 1002, which is provided with a semi-conductor laser (LD) as a light source, amplitude-modulates current by means of an output signal of the frequency multiplexer, thereby outputting an optical intensity modulated signal.

The optical distribution units 1003, 1004a, 1004b, 1005a–1005d are located to form a tree-shape optical network, and lights outputted from the optical transmitter 1002 are distributed and transmitted to the eight optical receivers 1006a–1006h. The optical amplification units 1008, 1009a, and 1009b are optionally disposed on the optical transmission path when the number of subscribers is large, when the transmission distance is long, or when a large amount of received light power is necessary such as AM modulation method.

On the other hand, the optical receivers 1006a–1006h to be supplied in each subscriber's household re-converse the received optical signals into electric signals by means of direct detection type optical receivers, then output frequency-multiplexed video signals. The tuners 1007a–1007h select video signals requested by subscribers from among frequency-multiplexed signals to be outputted from the optical receivers 1006a–1006h, and demodulate the selected signals. When the VOD program menu includes programs requested by the subscribers, the tuners send out a send-out request signal 1104 for the programs to the selector and modulator 1102 in the CATV center. For the transmission of the send-out request signal 1104, conventional telephone network or the like is used.

In order to realize VOD service in the optical CATV system with analog SCM transmission system, it is necessary to assign a part of the broadcasting band to the band for transmitting VOD signals (hereinafter VOD band) or to provide an additional VOD band by expanding the entire transmission band. However, the VOD band width cannot be expanded without limitation in either way, so that the number of carriers for the VOD signals is restricted. This restriction lead to the limitation of the number of subscribers (which corresponds to the number of carriers) to be allowed to use the VOD service at the same time in a single optical CATV system. Consequently, it becomes impossible to raise the concurrent utility rate of the VOD service (the number of concurrent VOD service users/the number of the entire subscribers), which means that a great increase in the number of subscribers cannot be expected.

One method to solve such a problem is to divide all the subscribers into some groups and provide respective optical transmitting equipment or optical transmitting network for each group. This can reduce the number of subscribers per optical transmitting equipment, thereby raising the substantial concurrent utility rate of the VOD service.

FIG. 2 is a block diagram showing a construction of the optical CATV system provided with the VOD service in which subscribers are divided into some groups in order to improve the concurrent utility rate, and in which the construction shown in FIG. 1 is provided for each group.

As shown in FIG. 2, the entire subscribers are divided into a group A and a group B, and the households of the subscribers in the group A are provided with the optical receivers 1006a–1006d, the tuners 1007a–1007d, and the households of the subscribers in the group B are provided with the optical receivers 1006e–1006h, and the tuners 1007e–1007h.

The groups A and B are respectively provided with the multi-channel video signal sources 1001a and 1001b, the video signal sources 1101a and 1101b for VOD service, the selectors and modulators 1102a and 1102b, the frequency multiplexing units 1103a and 1103b, and the optical transmitters 1002a and 1002b as the optical transmitting equipment. The optical transmission paths in the groups A and B are respectively provided with the optical amplification units 1009a and 1009b, the optical distribution units 1004a, 1005a, 1005b, and 1004b, 1005c, 1005d.

However, it is extremely costly to enlarge the optical transmitting equipment or to relay the optical transmitting network. Hence, it is a current issue to achieve VOD service with a high concurrent utility rate at a low cost in the present CATV system having increasing subscribers.

SUMMARY OF THE INVENTION

The object of the present invention is to provide an optical fiber cable service system capable of incorporating VOD service having a high concurrent utility rate, and further capable of flexibly responding to an increase in the number of VOD service users, without any serious change of optical transmitting equipment or without any necessity of relaying the optical transmitting network.

The above object can be achieved by the optical fiber cable service system constructed as follows.

In the CATV center, a plurality of video signals for broadcasting service are frequency-multiplexed, then optical-modulated, thereby obtaining a first optical-modulated signal. Furthermore, at least one video signal for VOD service which is requested by a plurality of subscribers is frequency-multiplexed, and then optical-modulated, thereby obtaining a second optical-modulated signal.

Then, the first and second optical-modulated signals are multiplexed and transferred to subscribers' households through the optical transmission paths. In the subscribers area, the transferred optical-modulated signals are converted into electric signals to reproduce frequency-multiplexed signals, and desired programs are selected.

As a result, it becomes possible to use different modulated optical wavelengths and different optical modulation methods between video signals for broadcasting service and for VOD service. Consequently, the restriction on the number of carriers in the VOD band is avoided, and VOD service with high concurrent utility rate can be incorporated without any serious change of optical transmitting equipment or without any necessity of relaying the optical transmitting network. In addition, it also becomes possible to construct a broadcasting system in accordance with the concurrent utility rate.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 is a block diagram showing a construction of the optical CATV system provided with the VOD service in which subscribers are divided into some groups in order to improve the concurrent utility rate.

FIG. 3 is a block diagram showing the construction of the optical fiber cable service system provided with VOD service of the first embodiment of the present invention.

DESCRIPTION OF THE PREFERRED EMBODIMENTS

Figure 1:
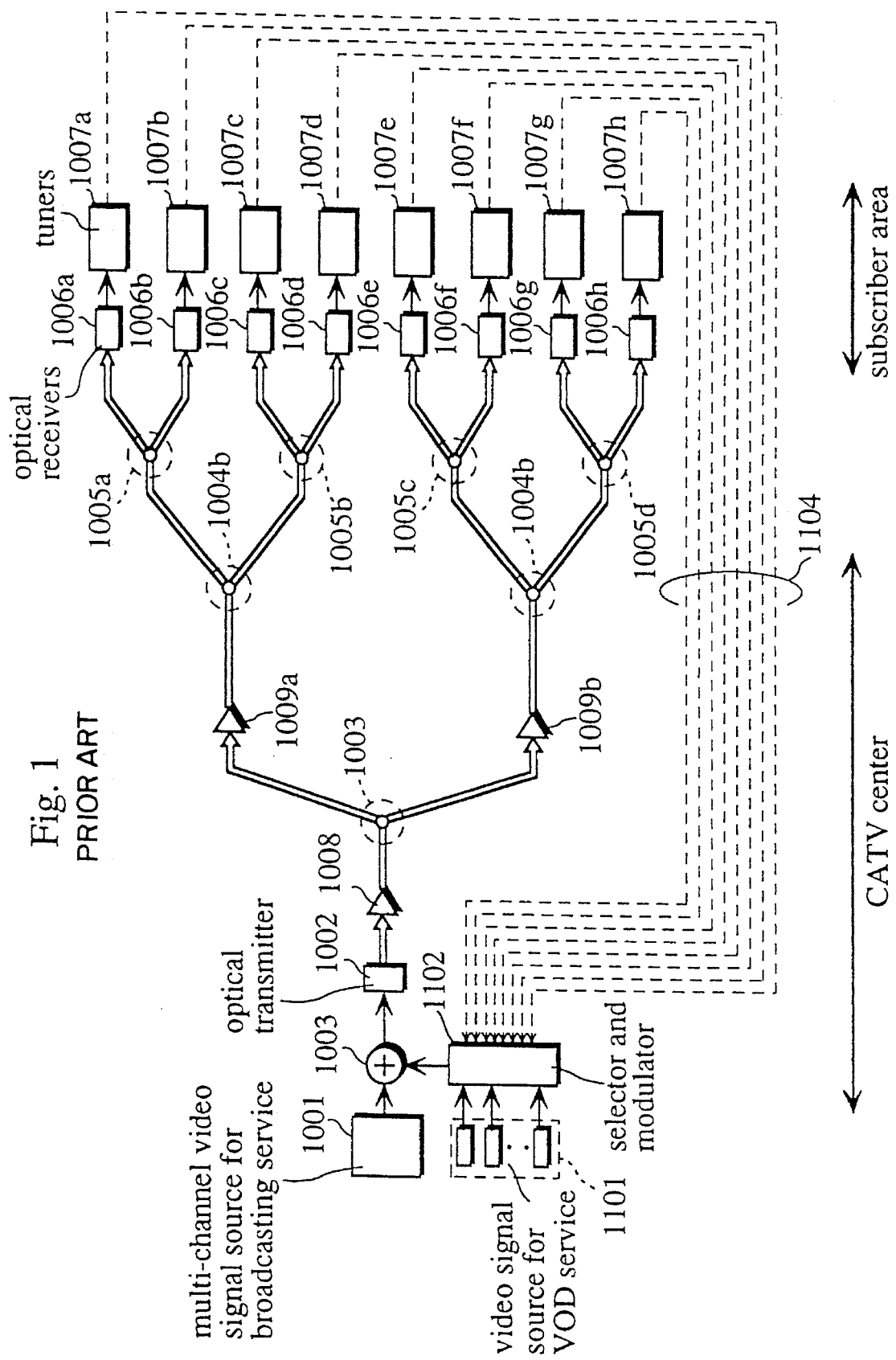
FIG. 1 is a block diagram showing a general construction of an optical CATV system provided with the VOD service.

The embodiments of the present invention will be explained with reference to drawings.

FIG. 3 is a block diagram showing the construction of the optical fiber cable service system provided with VOD service of the present embodiment which is applied to an optical network having a plurality of subscribers. The subscribers are divided into the group A and the group B like in the system shown in FIG. 2; however, the groups A and B share the same optical transmitting network, and the optical transmitting equipment in the CATV center 1 has a different construction from the system shown in FIG. 2. Especially, it is a feature of this embodiment that the groups A and B share the same multi-channel video signal source 1001 and the same video signal source 1101 for VOD service.

The system of this embodiment is mainly composed of a CATV center 1 which offers general broadcasting service and VOD service, a receiver system 2 which is provided to each subscriber to receive the service, an optical network 3 which is a tree-shape network as transmission paths for video signals sent from the CATV center 1 to the receiver system 2, and a transmission path 4 for requesting desired programs.

The multi-channel video signal source 1001 in the CATV center 1 modulates video signals of a plurality of channels (1ch–Nch) for broadcasting service based on a predetermined electric modulation method (for example, FM modulation) by using carriers ($f_1$–$f_N$) with different frequencies. The carriers are pre-assigned to a predetermined broadcasting band. Then, the modulated signals are frequency-multiplexed and outputted. Although analog base band video signal source is conventionally used as video signal source as shown in FIG. 3, digital video signal source can be used instead.

Then, the frequency-multiplexed signals are converted into optical signals based on a predetermined optical modulation method in the optical transmitter 1002 (refer to FIG. 4). Then, the optical signals are inputted to the optical modulators 202a and 202b via an optical amplifier 1008, an optical distributer 1003, an optical amplifiers 1009a and 1009b. When a subscriber wants to get a VOD program, or when VOD send-out request signals 203a and 203b to be sent through the transmission path 4 are received by the selectors and modulators 201a and 201b, the optical modulators 202a and 202b convert signals which have been selected and modulated by the video signal source 1101 for VOD service, frequency-multiplexed, and outputted by the selectors and modulator 201a or 201b into optical signals. Then, the optical signals are sent out to the optical network together with the optical signals sent out from the optical transmitter 1002.

Thus, the feature of this system is to couple the video signals of the normal broadcasting service and for VOD service in the state of optical signals.

The optical CATV network 3 is disposed in the form of a tree with optical distributors 1004a, 1004b, 1005a, 1005b, 1005c, and 1005d as far as each subscriber's household. In the receiver system 2 of each subscriber's household, optical signals transmitted from the optical receivers 1006a–1006h are converted into electric signals (frequency-multiplexed signals). In the tuners 1007a–1007h, programs desired by subscribers are selected from among the broadcasting program menu or the VOD program menu, and the video signals of the selected programs are demodulated.

As mentioned earlier, the tuners 1007a–1007h have a function of sending VOD send-out request signals 203a or 203b, and when a subscriber wants to get a VOD program, the VOD send-out request signal 203a or 203b is sent to the selectors and modulators 201a and 201b in the CATV center 1 via the transmission path 4.

Upon receiving the VOD send-out request signal 203a or 203b from a subscriber, the selectors and modulators 201a and 201b select and take out the corresponding video signal for VOD service from the video signal source 1101 for VOD service, and then modulate the taken out video signal for VOD service based on a predetermined electric modulation method, by means of carriers whose frequencies are pre-assigned within a predetermined VOD band. As the predetermined electric modulation, Quadrature Amplitude Modulation method (hereinafter QAM method) can be used. According to the QAM method, analog video signals are converted into digital signals through A/D conversion, and the amplitude and phase of a carrier is changed. The QAM method is advantageous when a large amount of information must be transmitted through a narrow transmission band width.

In this embodiment, the single video signal source 1101 is shared among all the groups; however, each group can be provided with its own video signal source as long as the cost increase is permitted. In such a case, each of the selectors and modulators 201a and 201b selects video signals for VOD service sent from a respective video signal source for VOD service.

Figure 4A:
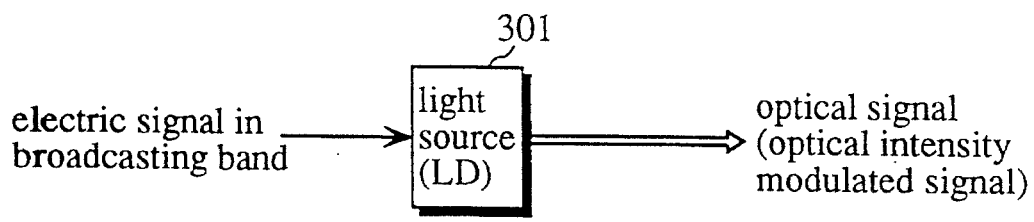
FIGS. 4(a)–(b) are block diagrams showing the construction of the optical transmitter 1002 shown in FIG. 3.
Figure 4B:
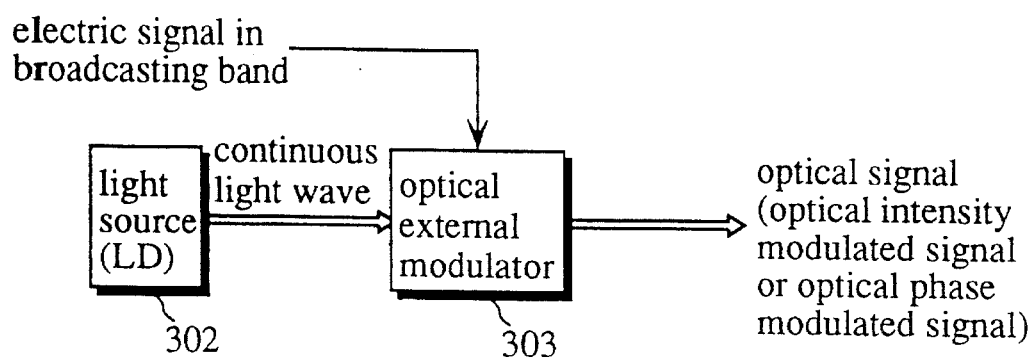

FIGS. 4(a)–(b) are block diagrams showing the construction of the optical transmitter 1002 shown in FIG. 3. The optical transmitter 1002 converts frequency-multiplexed video signals (electric signals) in the broadcasting band which are outputted from the multi-channel video signal source 1001 and outputs them as optical-modulated signals. As a modulation method, the direct modulation shown in FIG. 4(a) and the external modulation shown in FIG. 4(b) can be used.

The optical transmitter using the direct modulation shown in FIG. 4(a) is provided with a semi-conductor laser (LD) as a light source 301 having a predetermined optical wavelength (hereinafter wavelength for broadcasting service), and outputs an optical intensity modulated signal by amplitude-modulating current to be supplied to the LD by means of electric signals inputted in the broadcasting band.

The optical transmitter using the external modulation shown in FIG. 4(b) leads continuous lightwave sent from the light source 302 having an optical wavelength for broadcasting service to the optical external modulator 303, and outputs optical intensity modulated signals or optical phase modulated signals by modulating voltage to be applied on the optical external modulator 303 by means of electric signals to be inputted to the broadcasting band. In this case, as an optical external modulator can be a waveguide electrooptic modulator constructed on a lithium niobate crystal substrate (refer to R. C. Alferness, "Waveguide electrooptic modulators", IEEE Trans. Microwave Theory Tech., vol. MTT-30, PP, 1211–1136, 1982).

Figure 5A:
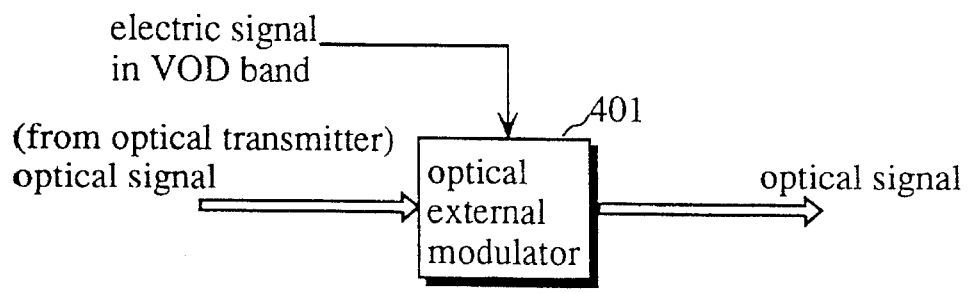
FIGS. 5(a)–(c) are block diagrams showing the construction of the optical modulators 202a and 202b shown in FIG. 3.
Figure 5B:
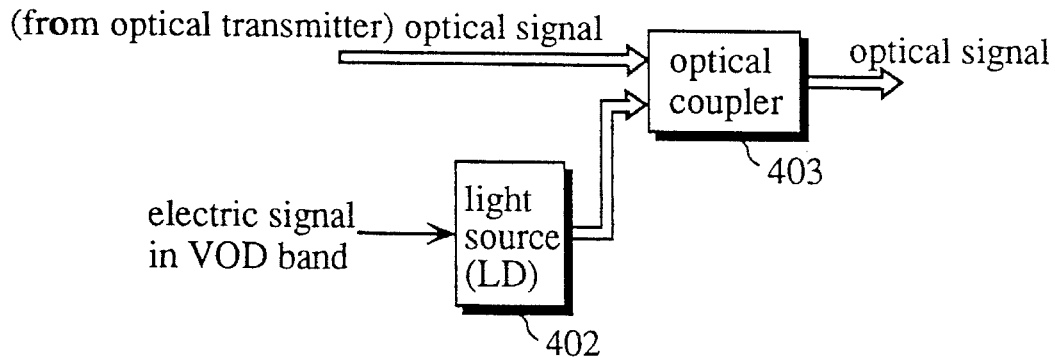
Figure 5C:
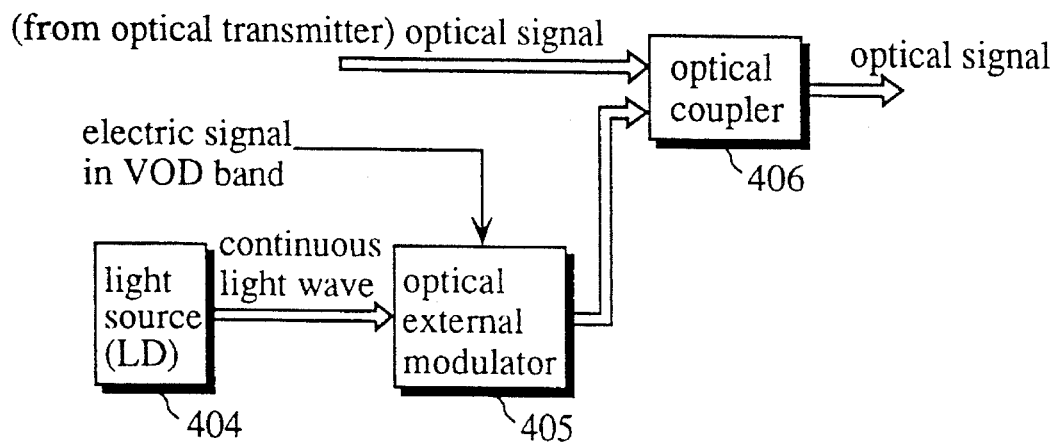

FIGS. 5(a)–(c) are block diagrams showing the construction of the optical modulators 202a and 202b shown in FIG. 3. The optical modulators 202a and 202b optical-modulate the frequency-multiplexed video signals in the VOD band to be outputted from the selectors and modulators 201a and 201b, and output the modulated signals together with the optical signals sent from the optical transmitter 1002.

As a modulation method for signals in the VOD band, the external modulation shown in FIG. 5(a) can be used where optical signals to be outputted from the optical transmitter 1002 are lead to an optical external modulator without using an independent light source, and modulated them by means of the electric signals inputted in the VOD band. According to the methods shown in FIGS.5 (b)–(c), independent light sources 402 and 404 having a predetermined optical wavelength (hereinafter optical wavelength for VOD service) are provided, and signals in the VOD band are converted into optical signals and outputted by coupling with optical signals sent from the optical transmitter 1002.

In the methods of FIG. 5(b), current supplied to the light source 402 for optical wavelength for VOD service is directly modulated by means of signals inputted to the VOD band. Then, the optical coupler 406 couples and outputs the optical signals outputted as a result of the modulation and the signals sent from the optical transmitter 1002.

In the method of FIG. 5(c), continuous lightwave sent from the light source 404 having an optical wavelength for VOD service is inputted to the optical external modulator 405. The optical coupler 406 couples and outputs the optical signals which have been external-modulated by VOD band signals and the optical signals sent from the optical transmitter 1002.

The following is a detailed description on the methods shown in FIGS. 5(a)–(c) from the view points of the relationship between the optical wavelengths for broadcasting service and VOD service, the construction of the optical receivers 1006a–1006h, and the disposition of the broadcasting band an the VOD band.

In a construction, the optical wavelengths for broadcasting service and for VOD service are equal, and also the optical transmitter and the optical modulator use the same optical modulating method. For example, if the optical transmitter and the optical modulator both use the intensity modulation, then the optical receiver is based on the direct detection. However, in this case, the broadcasting band and the VOD band must be disposed not to overlap each other in frequency area. Consequently, in such a construction, the number of carriers in the VOD band transmissible by one optical modulator is restricted.

In other constructions, the optical wavelengths for broadcasting service and for VOD service are equal or different, and the optical transmitter and the optical modulator use the same or different optical modulation methods.

FIG. 6 is a block diagram showing the construction of the optical receivers 1006a–1006h shown in FIG. 3.

Figure 6A:
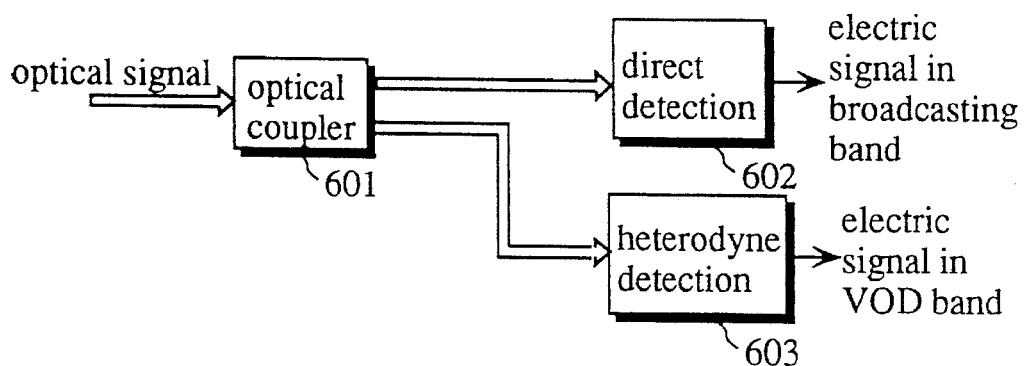
FIGS. 6(a)–(b) are block diagrams showing the construction of the optical receivers 1006a–1006h shown in FIG. 3.

In the construction shown in FIG. 6(a), the optical wavelength for broadcasting service and for VOD service are made equal, and the optical transmitter and the optical modulator use different optical modulation methods from each other. For example, if the optical transmitter outputs optical intensity modulated signals and the optical modulator outputs optical phase modulated signals, then the optical receiver is composed of an optical coupler 601 for diverging inputted lights, an optical receiver 602 based on direct detection for re-converting one of the diverged optical signals into electric signals in the VOD band, and another optical receiver 603 based on heterodyne detection for re-converting the other diverged optical signals into electric signals in the VOD band. In such a construction, there is no limitation on the arrangement of the broadcasting band and the VOD band.

Figure 6B:
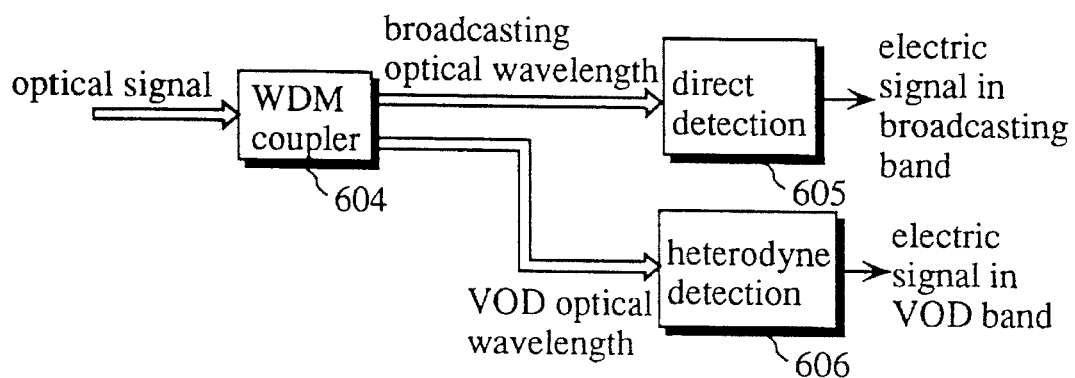

In another construction, optical wavelengths for broadcasting service and for VOD service are not equal, and the optical transmitter and the optical modulator use the same optical modulation method. For example, when the optical transmitter and the optical modulator both use the intensity modulated method, as shown in FIG. 6(b), the optical receiver is composed of an optical coupler 604 for diverging inputted lights into signals having an optical wavelength for broadcasting service and signals having an optical wavelength for VOD service, and optical receivers 605 and 606 based on direct detection for re-converting each wavelength signal into an electric signal. In such a construction, too, there is no limitation on the arrangement on the broadcasting band and VOD band.

When the optical wavelength for broadcasting service is not equal to the optical wavelength for VOD service, or when the optical transmitter is based on a different optical modulation method from the optical modulator, the VOD band may be set to overlap the broadcasting band. As a result, the entire light transmitting band can be used for transmitting VOD programs, which allows to realize VOD service with high concurrent utility rate.

The following is a description on the number of carriers in the VOD band when the optical wavelengths for broadcasting service and for VOD service are made equal, and the optical transmitter and the optical modulator use the same optical modulation method.

For example, when the number of carriers to be generated by each of the selectors and modulators 201a and 201b is made No, the number of subscribers in one group is made $N_k$, and the number of VOD programs to be able to be transmitted in a carrier is made m, it is preferable to be $N_k/m=N_c$. However, considering that the width of the VOD band is limited and the possibility that all the subscribers use the VOD service at the same time is very small when the number of subscribers in one group is very large, the number of carriers $N_c$ to be generated by the selectors and modulators 201a and 201b is made to be $N_c<N_k/m$.

The selectors and modulators 201a and 201b extract either VOD send-out request signal 203a or 203b which arrived earlier, thereby controlling the number of VOD programs to be sent out at the same time to be always $N_c$ or below. Furthermore, it is possible to minimize beat interference between each carrier in the broadcasting band and the VOD band if each of the selectors and modulators 201a and 201b generates a necessary number of carriers only when the VOD send-out request is issued, instead of always generating $N_c$ carriers.

The following is a description on the quality deterioration to be caused by beat interference among carriers in the broadcasting band and the VOD band when the optical modulator has a construction that optical signals sent from the optical transmitter 1002 are external-modulated as shown in FIG. 5(a).

Figure 7:
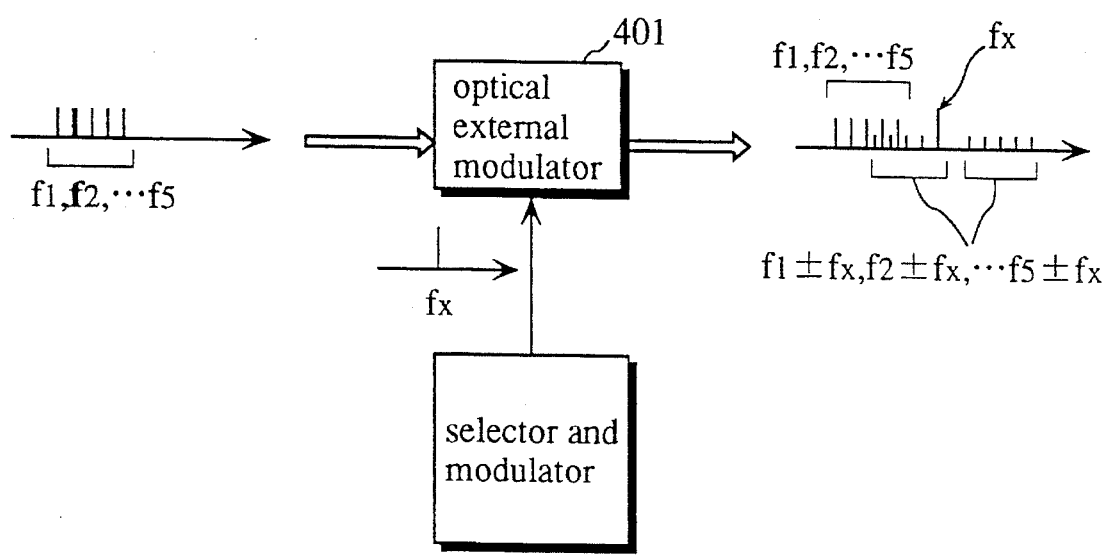
FIG. 7 is an illustration for explaining the mechanism of the generation of beat distortions which is caused when an external modulator is used as the optical modulator shown in FIG. 5(a).

FIG. 7 is an illustration for explaining the mechanism of the generation of beat distortions which is caused when an external modulator is used as the optical modulator shown in FIG.5(a). For example, when the optical signals, which have been already applied optical intensity modulation (modulation frequency $fn_n$; n=1 through 5) in the optical transmitter 1002, are further optical intensity modulated (modulation frequency:$f$ ) in the optical external modulator 401, the optical external modulator 401 performs the same operation as a mixer. Consequently, beat distortions (frequency $f_x \pm f_n$) are caused among modulated signals, which disturb mutual modulation. The quality deterioration becomes serious especially when the number of carriers increase in the VOD band, because this increases the number of beat distortions.

In order to solve this problem, the system of the present invention uses either FM modulation which can reduce modulation degree or digital modulation method such as QAM as the electric modulation method in the multi-channel video signal source 1001 and the selectors and modulators 201a and 201b. As a result, quality deterioration caused by beat interference can be minimized.

Figure 8A:
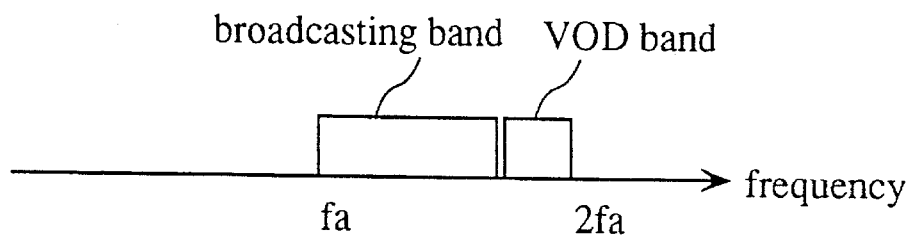
FIGS. 8(a)–(c) are illustrations to explain the methods for avoiding beat distortions shown in FIG. 7.
Figure 8B:
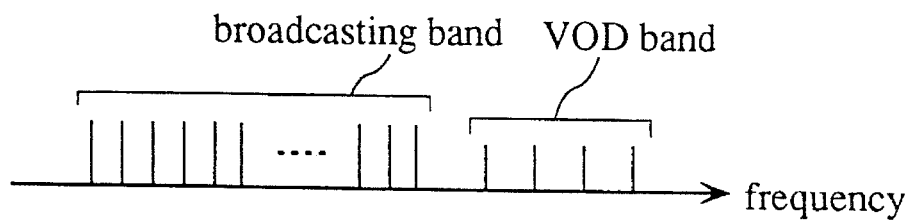
Figure 8C:
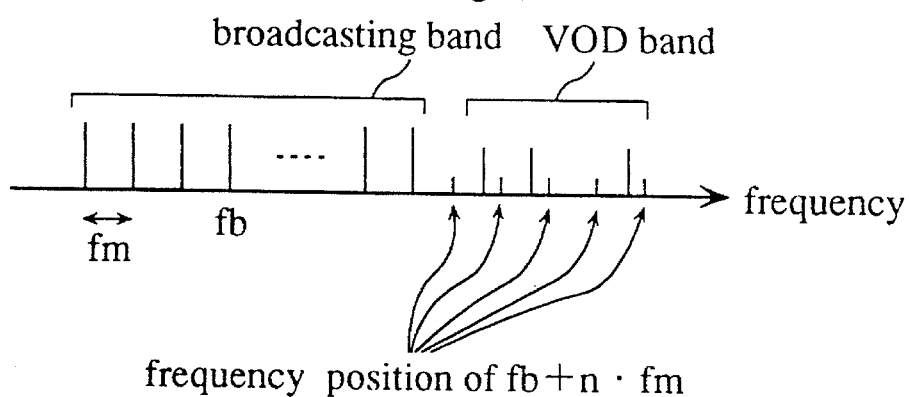

FIG. 8(a)–(c) are illustrations to explain the methods for avoiding beat distortions shown in FIG. 7. As shown in FIG. 8(a), if the entire transmission band composed of the broadcasting band and the VOD band is set to be within one octave (that is, when the broadcasting band begins at the frequency $f_a$, the entire transmission band is set within $f_a\sim 2f_a$), transmission quality is less affected by the generation of beat distortions. This is because many of the beat distortions are generated in frequencies outside the band. In such a case, AM modulation which demands a great modulation index can be used as the electric modulation method in the multi-channel video signal source 1001 and the selectors and modulators 201a and 201b.

The generation of distortions in the same frequency can be avoided by making the frequency span of carriers in the VOD band different from the frequency span of carriers in the broadcasting band as shown in FIG. 8(b), or making the frequency of the carrier in the VOD band unequal to $f_b+n*f_m$ (n is an integer of 1 or greater, $f_b$ is the frequency of carriers in the broadcasting band, and $f_m$ is a frequency span of carriers in the broadcasting band). As a result, the deterioration of actual image quality can be reduced.

The following is a description on the extensity of the optical fiber cable service system provided with VOD service. Since the number of carriers in the VOD band cannot be increased without any restriction, the system shown in FIG. 1 cannot move into an optical network provided with the VOD service having high current utility rate, in accordance with the increase in the subscribers.

In contrast, the system shown in FIG. 2 can raise the concurrent utility rate by dividing subscribers into some groups; however, each group needs its own optical transmitting equipment, so that the cost increase is inevitable.

Figure 9:
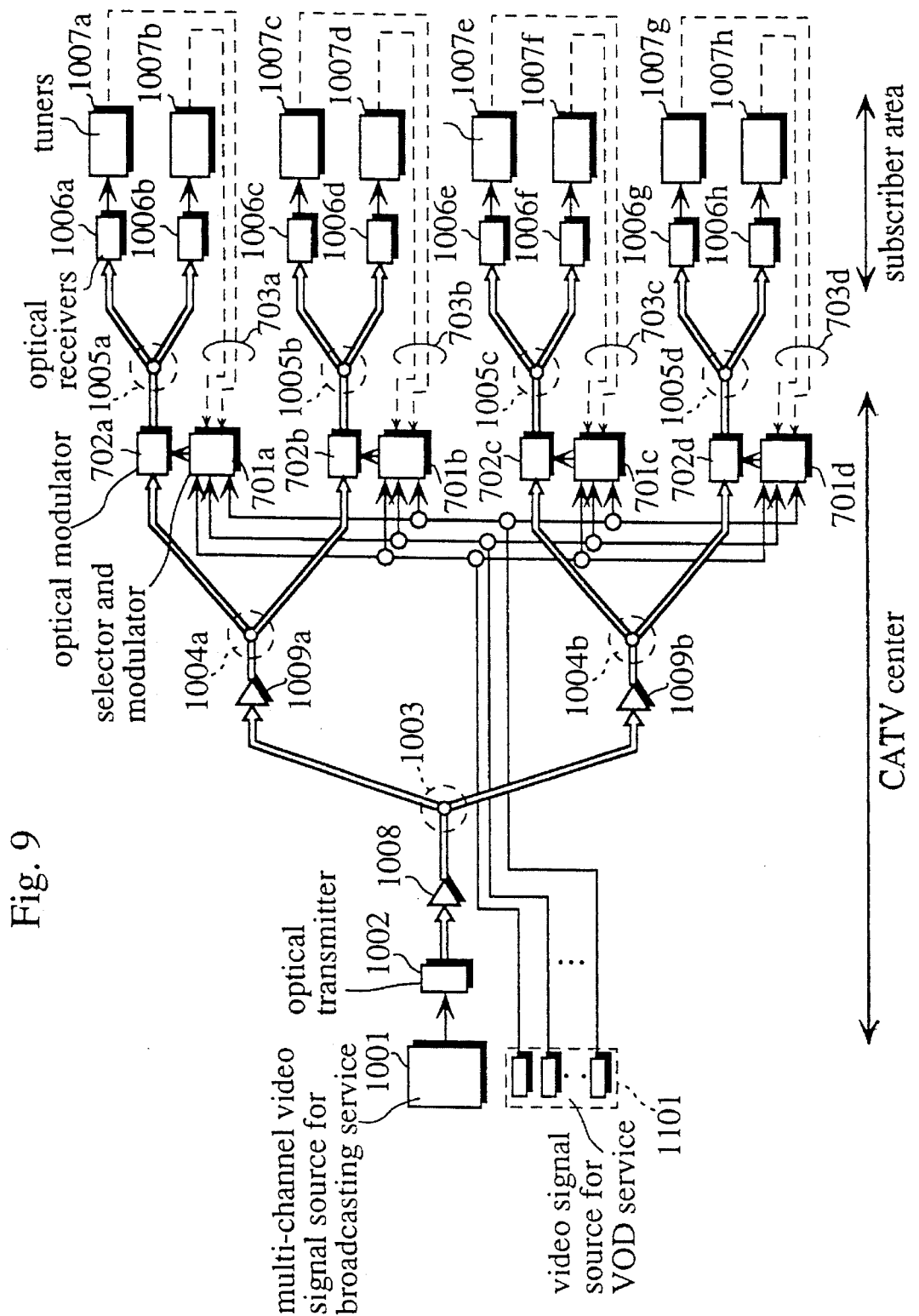
FIG. 9 is a block diagram showing the construction of the optical fiber cable service system provided with VOD service of the second embodiment of the present invention.

In the system of the present invention, the number of carriers in the VOD band is restricted when the optical transmitter and the optical modulator use the same optical wavelength and the same optical modulation method. However, even in such a construction, the number of subscribers put in charge of one optical modulator can be reduced by moving the location of the optical modulators in the CATV center closer to the subscribers and increasing their number as shown in FIG. 9. Consequently, the concurrent utility rate of the VOD service can be raised.

FIG. 9 is a block diagram showing the construction of the optical fiber cable service system provided with the VOD service according to the second embodiment, and explains extensity of the system.

When the location of the optical modulators 702a–702d is moved and increased their number, the optical modulators 702a–702d and the selectors and modulators 701a–701d that are comparatively compact and inexpensive are needed. According to such an arrangement, the multi-channel video signal source 1001, the video signal source 1101 for VOD, and large and expensive equipment such as the optical transmitter 1002 become dispensable. As a result, the concurrent utility rate of the VOD service can be improved.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical fiber cable service system for concurrently transmitting to subscribers multichannel broadcasting service video signals and VOD service video signals requested by the subscribers, said optical fiber cable service system comprising a broadcasting signal transmission means, a plurality of optical transmission means, and a broadcasting signal reception means, said broadcasting signal transmission means comprising:

a multichannel video signal output means for converting the broadcasting service video signals by means of a predetermined electric modulation method, into broadcasting signals, each having its own carrier frequency preassigned within a predetermined broadcasting band, and for frequency-multiplexing the broadcasting signals and outputting the frequency-multiplexed broadcasting signals;

a broadcasting optical-modulated signal output means for optical-modulating the frequency-multiplexed broadcasting signals outputted from said multichannel video signal output means based on a predetermined optical modulation method, and for outputting the optical-modulated broadcasting signals as broadcasting optical-modulated signals;

a VOD service video signal storage means provided for a plurality of subscriber groups or for each of the plurality of subscriber groups for storing at least one VOD service video signal;

a VOD service video signal selection and output means provided for each of the plurality of subscriber groups for selecting at least one VOD service video signal requested by a subscriber belonging to a corresponding subscriber group from said VOD service video signal storage means, for converting the selected VOD service video signals based on the predetermined electric modulation method, into broadcasting signals, each having its own carrier frequency preassigned within a predetermined VOD band, for frequency-multiplexing the broadcasting signals, and for outputting frequency-multiplexed broadcasting signals; and an optical transmission video signal output means provided for each of the subscriber groups for multiplexing the broadcasting optical-modulated signals and VOD optical-modulated broadcasting signals, the VOD optical-modulated broadcasting signals having been obtained by optical-modulating the frequency-multiplexed broadcasting signals outputted from said VOD service video signal selection and output means by means of the predetermined optical modulation method, and for outputting obtained signals as optical transmission video signals;

each of said plurality of optical transmission means being a medium for transmitting the optical transmission video signals outputted from said optical transmission video signal output means to each subscriber belonging to each of the plurality of subscriber groups, formed in a tree structure by using at least one optical distribution means, and being optionally provided with an optical amplifier on an optical transmission path;

said broadcasting signal reception means being provided to each of the subscribers which are divided into groups and receiving predetermined video programs to be sent from said broadcasting signal transmission means via said optical transmission means, said broadcasting signal reception means comprising:

a video signal reproduction means for converting the optical transmission video signals sent through said optical transmission means into frequency-multiplexed broadcasting service video signals and frequency-multiplexed VOD service video signals, and for outputting the frequency-multiplexed broadcasting service video signals and the frequency-multiplexed VOD service video signals; and a program selection and communication means for selecting programs requested by subscribers from among broadcasting service video programs and VOD service video programs, and asking said VOD service video signal selection and output means provided for each of the plurality of subscriber groups to send out the VOD service video programs requested by subscribers.

2. The optical fiber cable service system of claim 1, wherein said optical transmission video signal output means optical-multiplexes the broadcasting optical-modulated signals outputted from said broadcasting optical-modulated signal output means with VOD optical-modulated broadcasting signals obtained by external-modulating the broadcasting optical-modulated signals with the frequency-multiplexed broadcasting signals outputted from said VOD service video signal selection and output means, and outputs the optical-multiplexed broadcasting optical-modulated signals as optical transmission video signals.

3. The optical fiber cable service system of claim 2, wherein when the optical modulation method used by said broadcasting optical-modulated signal output means and the optical modulation method used by said optical transmission video signal output means are an optical intensity modulation method, said video signal reproduction means converts the optical transmission video signals sent through said optical transmission means into frequency-multiplexed broadcasting service video signals and frequency-multiplexed VOD service video signals through a direct detection, and outputs the frequency-multiplexed broadcasting service video signals and the frequency-multiplexed VOD service video signals.

4. The optical fiber cable service system of claim 2, wherein when the optical modulation method used by said broadcasting optical-modulated signal output means and the optical modulation method used by said optical transmission video signal output means are an optical phase modulation method, said video signal reproduction means converts the optical transmission video signals sent through said optical transmission means into frequency-multiplexed broadcasting service video signals and frequency-multiplexed VOD service video signals through a heterodyne detection, and outputs the frequency-multiplexed broadcasting service video signals and the frequency-multiplexed VOD service video signals.

5. The optical fiber cable service system of claim 2, wherein when one of the optical modulation methods used by said broadcasting optical-modulated signal output means and the optical modulation method used by said optical transmission video signal output means is an optical intensity modulation method and a remaining method is an optical phase modulation method, said video signal reproduction means divides each of the optical transmission video signals sent through said optical transmission means into a first signal and a second signal, directly detects the first signal to convert optical intensity-modulated video signals into one of the frequency-multiplexed broadcasting service video signals and the frequency-multiplexed VOD service video signals, and heterodyne-detects the second signal to convert optical phase-modulated video signals into a remaining one of the frequency-multiplexed broadcasting service video signals and the frequency-multiplexed VOD service video signals, and outputs the frequency-multiplexed broadcasting service video signals and the frequency-multiplexed VOD service video signals.

6. The optical fiber cable service system of claim 1, wherein said optical transmission video signal output means optical-couples and optical-multiplexes the broadcasting optical-modulated signals outputted from said broadcasting optical-modulated signal output means with VOD optical-modulated broadcasting signals obtained by optical modulating the frequency-multiplexed broadcasting signals outputted from said VOD service video signal selection and output means, and outputs obtained signals as the optical transmission video signals.

7. The optical fiber cable service system of claim 6, wherein when the optical modulation method used by said broadcasting optical-modulated signal output means and the optical modulation method used by said optical transmission video signal output means are an optical intensity modulation method, and when a first optical wavelength of the broadcasting optical-modulated signal outputted from said broadcasting optical-modulated signal output means and a second optical wavelength of the VOD optical-modulated broadcasting signals are equal, said video signal reproduction means converts the optical transmission video signals sent through said optical transmission means into frequency-multiplexed broadcasting service video signals and frequency-multiplexed VOD service video signals through a direct detection, and outputs the frequency-multiplexed broadcasting service video signals and the frequency-multiplexed VOD service video signals.

8. The optical fiber cable service system of claim 6, wherein when the optical modulation method used by said broadcasting optical-modulated signal output means and the optical modulation method used by said optical transmission video signal output means are an optical phase modulation method, and when a first optical wavelength of the broadcasting optical-modulated signals outputted from said broadcasting optical-modulated signal output means and a second optical wavelength of the VOD optical-modulated broadcasting signals are equal, said video signal reproduction means converts the optical transmission video signals sent through said optical transmission means into frequency-multiplexed broadcasting service video signals and frequency-multiplexed VOD service video signals through a heterodyne detection, and outputs the frequency-multiplexed broadcasting service video signals and the frequency-multiplexed VOD service video signals.

9. The optical fiber cable service system of claim 6, wherein when one of the optical modulation methods used by said broadcasting optical-modulated signal output means and the optical modulation method used by said optical transmission video signal output means is an optical intensity modulation method and a remaining method is an optical phase modulation method, and when a first optical wavelength of the broadcasting optical-modulated signals outputted from said broadcasting optical-modulated signal output means and a second optical wavelength of the VOD optical-modulated broadcasting signals are equal, said video signal reproduction means divides each of the optical transmission video signals sent through said optical transmission means into a first signal and a second signal, directly detects the first signal to convert optical intensity-modulated video signals into one of the frequency-multiplexed broadcasting service video signals and the frequency-multiplexed VOD service video signals, and heterodyne-detects the second signal to convert optical phase-modulated video signals into a remaining one of the frequency-multiplexed broadcasting service video signals and the frequency-multiplexed VOD service video signals, and outputs the frequency-multiplexed broadcasting service video signals and the frequency-multiplexed VOD service video signals.

10. The optical fiber cable service system of claim 6, wherein when the optical modulation method used by said broadcasting optical-modulated signal output means and the optical modulation method used by said optical transmission video signal output means are an optical intensity modulation method, and when a first optical wavelength of the broadcasting optical-modulated signals outputted from said broadcasting optical-modulated signal output means and a second optical wavelength of the VOD optical-modulated broadcasting signals are unequal, said video signal reproduction means divides the optical transmission video signals sent through said optical transmission means into the broadcasting optical-modulated signals and the VOD optical-modulated broadcasting service signals, performs a direct detection to convert the broadcasting optical-modulated signals into frequency-multiplexed broadcasting service video signals and to convert the VOD optical-modulated broadcasting service signals into frequency-multiplexed VOD service video signals, and outputs the frequency-multiplexed broadcasting service video signals and the frequency-multiplexed VOD service video signals.

11. The optical fiber cable service system of claim 6, wherein when the optical modulation method used by said broadcasting optical-modulated signal output means and the optical modulation method used by said optical transmission video signal output means are an optical phase modulation method, and when a first optical wavelength of the broadcasting optical-modulated signals outputted from said broadcasting optical-modulated signal output means and a second optical wavelength of the VOD optical-modulated broadcasting signals are unequal, said video signal reproduction means divides the optical transmission video signals sent through said optical transmission means into the broadcasting optical-modulated signals and the VOD optical-modulated broadcasting service signals, performs a heterodyne detection to convert the broadcasting optical-modulated signals into frequency-multiplexed broadcasting service video signals and to convert the VOD optical-modulated broadcasting service signals into frequency-multiplexed VOD service video signals, and outputs the frequency-multiplexed broadcasting service video signals and the frequency-multiplexed VOD service video signals.

12. The optical fiber cable service system of claim 6, wherein when one of the optical modulation methods used by said broadcasting optical modulated signal output means and the optical modulation method used by said optical transmission video signal output means is an optical intensity modulation method and a remaining method is an optical phase modulation method, and when a first optical wavelength of the broadcasting optical-modulated signals outputted from said broadcasting optical-modulated signal output means and a second optical wavelength of the VOD optical-modulated broadcasting signals are unequal, said video signal reproduction means divides each of the optical transmission video signals sent through said optical transmission means into a first signal and a second signal, directly detects the first signal to convert optical intensity-modulated video signals into one of the frequency-multiplexed broadcasting service video signals and the frequency-multiplexed VOD service video signals, and heterodyne-detects the second signal to convert optical phase-modulated video signals into a remaining one of the frequency-multiplexed broadcasting service video signals and the frequency-multiplexed VOD service video signals, and outputs the frequency-multiplexed broadcasting service video signals and the frequency-multiplexed VOD service video signals.

13. An optical fiber cable service system for concurrently transmitting to subscribers multichannel broadcasting service video signals and VOD service video signals requested by the subscribers, said optical fiber cable service system comprising a broadcasting signal transmission means, a plurality of optical transmission means, and a broadcasting signal reception means, said broadcasting signal transmission means comprising:
a multichannel video signal output means for converting the broadcasting service video signals by means of a predetermined electric modulation method, into first broadcasting signals, each having its own carrier frequency preassigned within a predetermined broadcasting band, and for frequency-multiplexing the broadcasting signals and outputting the frequency-multiplexed first broadcasting signals;
a broadcasting optical-modulated signal output means for optical-modulating the frequency-multiplexed first broadcasting signals outputted from said multichannel video signal output means based on a predetermined optical modulation method, and for outputting the optical-modulated broadcasting signals as first broadcasting optical-modulated signals;
means for branching the first broadcasting optical-modulated broadcasting signals into respective separate optical transmission means;
a VOD service video signal storage means provided for a plurality of subscriber groups or for each of the plurality of subscriber groups for storing at least one VOD service video signal;

a VOD service video signal selection and output means provided for each of the plurality of subscriber groups for selecting at least one VOD service video signal requested by a subscriber belonging to a corresponding subscriber group from said VOD service video signal storage means, for converting the selected VOD service video signals based on the predetermined electric modulation method, into second broadcasting signals, each having its own carrier frequency preassigned within a predetermined VOD band, for frequency-multiplexing the second broadcasting signals, and for outputting frequency-multiplexed second broadcasting signals; and
an optical transmission video signal output means provided for each of the subscriber groups downstream of the broadcasting optical-modulated signal output means and the branching means for multiplexing the first broadcasting optical-modulated signals and VOD optical-modulated second broadcasting signals, the VOD optical-modulated second broadcasting signals having been obtained by optical-modulating the frequency-multiplexed second broadcasting signals outputted from said VOD service video signal selection and output means by means of the predetermined optical modulation method, and for outputting obtained signals as optical transmission video signals as requested by each specific subscriber group;
each of said plurality of optical transmission means being a medium for transmitting the optical transmission video signals outputted from said optical transmission video signal output means to each subscriber belonging to each of the plurality of subscriber groups, formed in a tree structure by using at least one optical distribution means;
said broadcasting signal reception means being provided to each of the subscribers which are divided into groups and receiving predetermined video programs to be sent from said broadcasting signal transmission means via said optical transmission means, said broadcasting signal reception means comprising:
a video signal reproduction means for converting the optical transmission video signals sent through said optical transmission means into frequency-multiplexed broadcasting service video signals and frequency-multiplexed VOD service video signals, and for outputting the frequency-multiplexed broadcasting service video signals and the frequency-multiplexed VOD service video signals; and
a program selection and communication means for selecting programs requested by subscribers from among broadcasting service video programs and VOD service video programs, and asking said VOD service video signal selection and output means provided for each of the plurality of subscriber groups to send out the VOD service video programs requested by subscribers.

14. An optical fiber cable service system for concurrently transmitting to subscribers multichannel broadcasting service video signals and VOD service video signals requested by the subscribers, said optical fiber cable service system comprising a broadcasting signal transmission means, a plurality of optical transmission means, and a broadcasting signal reception means, said broadcasting signal transmission means comprising:
a multichannel video signal output means for converting the broadcasting service video signals by means of a predetermined electric modulation method, into first broadcasting signals, each having its own carrier frequency preassigned within a predetermined broadcasting band, and for frequency-multiplexing the broadcasting signals and outputting the frequency-multiplexed first broadcasting signals;

a broadcasting optical-modulated signal output means for optical-modulating the frequency-multiplexed first broadcasting signals outputted from said multi-channel video signal output means based on a predetermined optical modulation method, and for outputting the optical-modulated broadcasting signals as first broadcasting optical-modulated signals;

means for branching the first broadcasting optical-modulated broadcasting signals into at least a pair of separate optical transmission means, each optical transmission means servicing a separate subscriber group of a predetermined number of subscribers;

a VOD service video signal storage means for storing at least one VOD service video signal;

a pair of VOD service video signal selection and output means, one provided for each of the subscriber groups for selecting at least one VOD service video signal requested by a subscriber belonging to a corresponding subscriber group from said VOD service video signal storage means, for converting the selected VOD service video signals based on the predetermined electric modulation method, into second broadcasting signals, each having its own carrier frequency preassigned within a predetermined VOD band, for frequency-multiplexing the second broadcasting signals, and for outputting frequency-multiplexed second broadcasting signals; and a pair of optical transmission video signal output means provided for each of the subscriber groups downstream of the broadcasting optical-modulated signal output means and the branching means for respectively multiplexing the first broadcasting optical-modulated signals and VOD optical-modulated second broadcasting signals, the VOD optical-modulated second broadcasting signals having been obtained by optical-modulating the frequency-multiplexed second broadcasting signals outputted from said VOD service video signal selection and output means by means of the predetermined optical modulation method, and for outputting obtained signals as optical transmission video signals as requested by each specific subscriber group;

each of said plurality of optical transmission means being a medium for transmitting the optical transmission video signals outputted from said optical transmission video signal output means to each subscriber belonging to each of the subscriber groups, formed in a tree structure by using at least one optical distribution means;

said broadcasting signal reception means being provided to each of the subscribers and receiving predetermined video programs to be sent from said broadcasting signal transmission means via said optical transmission means, said broadcasting signal reception means comprising:

a video signal reproduction means for converting the optical transmission video signals sent through said optical transmission means into frequency-multiplexed broadcasting service video signals and frequency-multiplexed VOD service video signals, and for outputting the frequency-multiplexed broadcasting service video signals and the frequency-multiplexed VOD service video signals; and a program selection and communication means for selecting programs requested by subscribers from among broadcasting service video programs and VOD service video programs, and communicating directly with said VOD service video signal selection and output means provided for the subscriber group containing the subscriber to send out the VOD service video programs requested by that subscriber.

15. The optical fiber cable service system of claim 14, wherein each of said optical transmission video signal output means optical-multiplexes the first broadcasting optical-modulated signals outputted from said broadcasting optical-modulated signal output means with VOC optical-modulated broadcasting signals obtained by external-modulating the first broadcasting optical-modulated signals with the frequency-multiplexed broadcasting signals outputted from said VOD service video signal selection and output means, and outputs the optical-multiplexed broadcasting optical-modulated signals as optical transmission video signals.

16. The optical fiber cable service system of claim 15, wherein when the optical modulation method used by said broadcasting optical-modulated signal output means and the optical modulation method used by each of said optical transmission video signal output means are an optical intensity modulation method, said video signal reproduction means converts the optical transmission video signals sent through said optical transmission means into frequency-multiplexed broadcasting service video signals and frequency-multiplexed VOD service video signals through a direct detection, and outputs the frequency-multiplexed broadcasting service video signals and the frequency-multiplexed VOD service video signals.

17. The optical fiber cable service system of claim 14, wherein each of said optical transmission video signal output means optical-couples and optical-multiplexes the first broadcasting optical-modulated signals outputted from said broadcasting optical-modulated signal output means with VOD optical-modulated broadcasting signals obtained by optical modulating the second frequency-multiplexed broadcasting signals outputted from said VOD service video signal selection and output means, and outputs obtained signals as the optical transmission video signals.

18. The optical fiber cable service system of claim 17, wherein when the optical modulation method used by said broadcasting optical-modulated signal output means and the optical modulation method used by said optical transmission video signal output means are an optical intensity modulation method, and when a first optical wavelength of the broadcasting optical-modulated signal outputted from said broadcasting optical-modulated signal output means and a second optical wavelength of the VOD optical-modulated broadcasting signals are equal, said video signal reproduction means converts the optical transmission video signals sent through said optical transmission means into frequency-multiplexed broadcasting service video signals and frequency-multiplexed VOD service video signals through a direct detection, and outputs the frequency-multiplexed broadcasting service video signals and the frequency-multiplexed VOD service video signals.

19. The optical fiber cable service system of claim 17, wherein when the optical modulation method used by said broadcasting optical-modulated signal output means and the optical modulation method used by said optical transmission video signal output means are an optical intensity modulation method, and when a first optical wavelength of the broadcasting optical-modulated signals outputted from said broadcasting optical-modulated signal output means and a second optical wavelength of the VOD optical-modulated broadcasting signals are unequal, said video signal reproduction means divides the optical transmission video signals sent through said optical transmission means into the broadcasting optical-modulated signals and the VOD optical-modulated broadcasting service signals, performs a direct detection to convert the broadcasting optical-modulated signals into frequency-multiplexed broadcasting service video signals and to convert the VOD optical-modulated broadcasting service signals into frequency-multiplexed VOD service video signals, and outputs the frequency-multiplexed broadcasting service video signals and the frequency-multiplexed VOD service video signals.

20. The optical fiber cable service system of claim 17, wherein when the optical modulation method used by said broadcasting optical-modulated signal output means and the optical modulation method used by said optical transmission video signal output means are an optical phase modulation method, and when a first optical wavelength of the broadcasting optical-modulated signals outputted from said broadcasting optical-modulated signal output means and a second optical wavelength of the VOD optical-modulated broadcasting signals are unequal, said video signal reproduction means divides the optical transmission video signals sent through said optical transmission means into the broadcasting optical-modulated signals and the VOD optical-modulated broadcasting service signals, performs a heterodyne detection to convert the broadcasting optical-modulated signals into frequency-multiplexed broadcasting service video signals and to convert the VOD optical-modulated broadcasting service signals into frequency-multiplexed VOD service video signals, and outputs the frequency-multiplexed broadcasting service video signals and the frequency-multiplexed VOD service video signals.

21. The optical fiber cable service system of claim 17, wherein when one of the optical modulation methods used by said broadcasting optical modulated signal output means and the optical modulation method used by said optical transmission video signal output means is an optical intensity modulation method and a remaining method is an optical phase modulation method, and when a first optical wavelength of the broadcasting optical-modulated signals outputted from said broadcasting optical-modulated signal output means and a second optical wavelength of the VOD optical-modulated broadcasting signals are unequal, said video signal reproduction means divides each of the optical transmission video signals sent through said optical transmission means into a first signal and a second signal, directly detects the first signal to convert optical intensity-modulated video signals into one of the frequency-multiplexed broadcasting service video signals and the frequency-multiplexed VOD service video signals, and heterodyne-detects the second signal to convert optical phase-modulated video signals into a remaining one of the frequency-multiplexed broadcasting service video signals and the frequency-multiplexed VOD service video signals, and outputs the frequency-multiplexed broadcasting service video signals and the frequency-multiplexed VOD) service video signals.

* * * * *